US012688085B2

(12) United States Patent
Ma et al.

(10) Patent No.: US 12,688,085 B2
(45) Date of Patent: Jul. 21, 2026

(54) METHOD AND APPARATUS FOR PROCESSING FAULTY MEMORY MODULE, AND ELECTRONIC DEVICE AND NON-TRANSITORY READABLE STORAGE MEDIUM

(71) Applicant: SUZHOU METABRAIN INTELLIGENT TECHNOLOGY CO., LTD., Suzhou (CN)

(72) Inventors: Xiaoyu Ma, Suzhou (CN); Ping Guo, Suzhou (CN); Xinglong Wang, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/116,467

(22) PCT Filed: Jan. 3, 2024

(86) PCT No.: PCT/CN2024/070456
§ 371 (c)(1),
(2) Date: Mar. 28, 2025

(87) PCT Pub. No.: WO2024/259950
PCT Pub. Date: Dec. 26, 2024

(65) Prior Publication Data
US 2026/0003726 A1       Jan. 1, 2026

(30) Foreign Application Priority Data
Jun. 21, 2023     (CN) ......................... 202310742167.4

(51) Int. Cl.
*G06F 11/07*              (2006.01)

(52) U.S. Cl.
CPC ........ *G06F 11/0793* (2013.01); *G06F 11/073* (2013.01)

(58) Field of Classification Search
CPC ........................... G06F 11/0793; G06F 11/073
See application file for complete search history.

(56) References Cited

U.S. PATENT DOCUMENTS

| | | | |
|---|---|---|---|
| 10,854,242 B2 * | 12/2020 | Shabbir | G11C 5/04 |
| 2019/0179754 A1 | 6/2019 | Steinmacher-Burow | |
| 2021/0374056 A1 * | 12/2021 | Malladi | G06F 15/17331 |

FOREIGN PATENT DOCUMENTS

| | | |
|---|---|---|
| CN | 109284207 A | 1/2019 |
| CN | 110109782 A | 8/2019 |

(Continued)

OTHER PUBLICATIONS

Search Report dated Jul. 26, 2023 received in Chinese Application No. 202310742167.4, together with an English-language translation.

(Continued)

*Primary Examiner* — Bryce P Bonzo
*Assistant Examiner* — Audrey Emma Whitesell
(74) *Attorney, Agent, or Firm* — Scully, Scott, Murphy & Presser, P.C.

(57) ABSTRACT

A method for processing faulty memory module and apparatus, and an electronic device and a non-transitory readable storage medium are provided. The method for processing faulty memory module includes: acquiring a first power-down command, the first power-down command being used for instructing a baseboard management controller of a memory resource pool to perform power-down processing on a faulty memory module in the memory resource pool; and in response to the first power-down command, when a first memory module in the memory resource pool is in a fault state and is allowed to be powered down, sending a (Continued)

Acquire a first power-down command, wherein the first power-down command is used for instructing a baseboard management controller of a memory resource pool to perform power-down processing on a faulty memory module in the memory resource pool                     S202

In response to the first power-down command, the first memory module in the memory resource pool is in the fault state and is allowed to be powered down, send a second power-down command to a target memory expander controller to which the first memory module belongs, wherein the second power-down command is used for instructing the target memory expander controller to perform power-down processing on the first memory module                     S204 second power-down command to a target memory expander controller to which the first memory module belongs, the second power-down command being used for instructing the target memory expander controller to perform power-down processing on the first memory module.

20 Claims, 5 Drawing Sheets

(56) References Cited

FOREIGN PATENT DOCUMENTS

| | | |
|---|---|---|
| CN | 111752776 A | 10/2020 |
| CN | 114218037 A | 3/2022 |
| CN | 115509333 A | 12/2022 |
| CN | 115686872 A | 2/2023 |
| CN | 116483613 A | 7/2023 |

OTHER PUBLICATIONS

Written Opinion dated Mar. 15, 2024 received in International Application No. PCT/CN2024/070456, together with an English-language translation.
International Search Report dated Mar. 28, 2024 received in International Application No. PCT/CN2024/070456, together with an English-language translation.

* cited by examiner

FIG. 1

Transmission device 106

Input/output device 108

Processor 102

Memory 102

FIG. 2

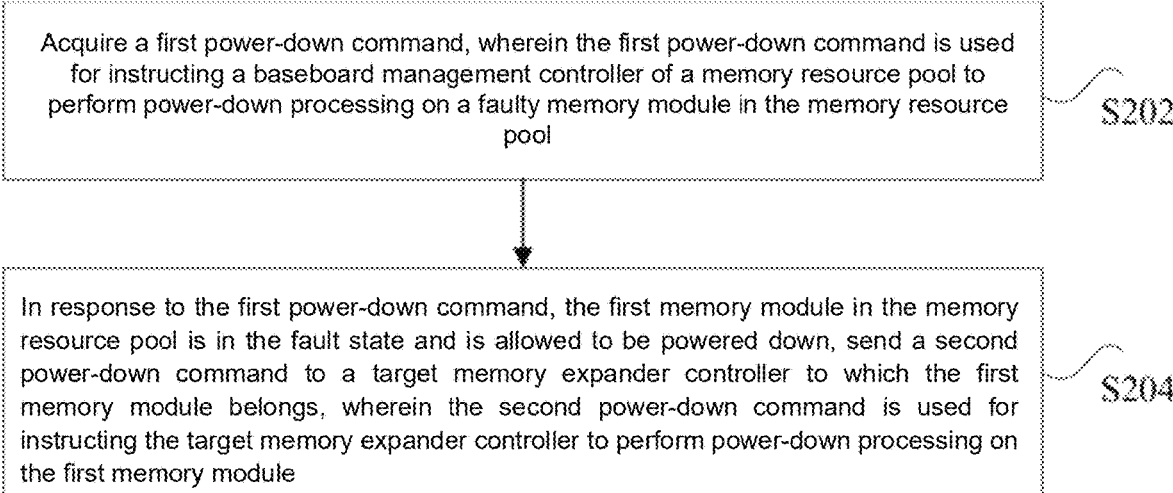

Acquire a first power-down command, wherein the first power-down command is used for instructing a baseboard management controller of a memory resource pool to perform power-down processing on a faulty memory module in the memory resource pool — S202

In response to the first power-down command, the first memory module in the memory resource pool is in the fault state and is allowed to be powered down, send a second power-down command to a target memory expander controller to which the first memory module belongs, wherein the second power-down command is used for instructing the target memory expander controller to perform power-down processing on the first memory module — S204

FIG. 3

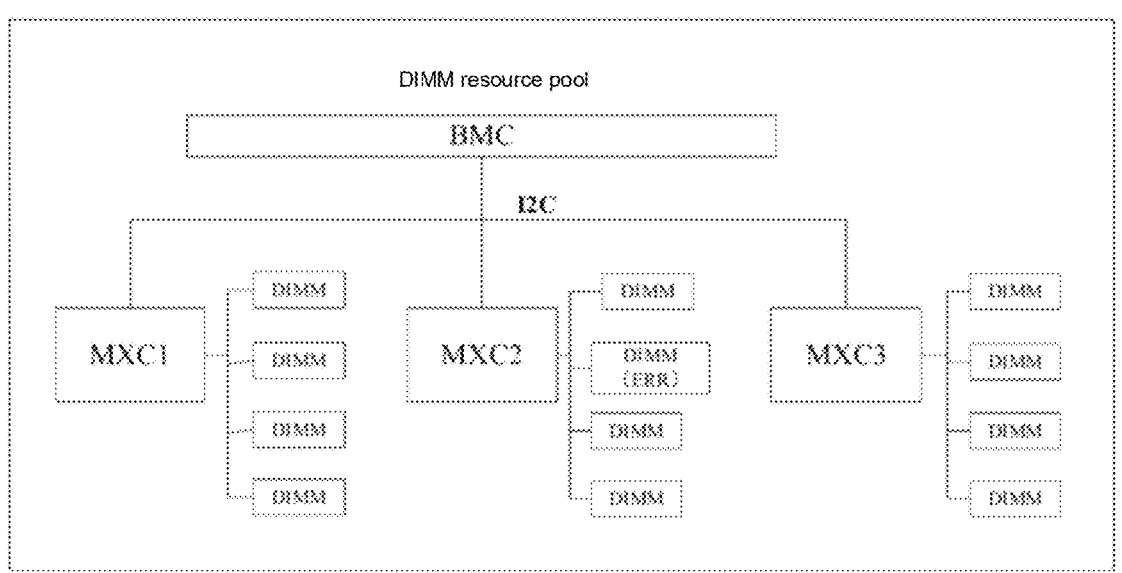

METHOD AND APPARATUS FOR PROCESSING FAULTY MEMORY MODULE, AND ELECTRONIC DEVICE AND NON-TRANSITORY READABLE STORAGE MEDIUM

CROSS-REFERENCE TO RELATED APPLICATIONS

This application is a National Stage Entry under 35 U.S.C. § 371 of PCT International Application No PCT/CN2024/070456 filed on Jan. 3, 2024, which claims the priority to the Chinese Patent Application No. 202310742167.4, titled "METHOD AND APPARATUS FOR PROCESSING FAULTY MEMORY MODULE, AND ELECTRONIC DEVICE AND NON-TRANSITORY READABLE STORAGE MEDIUM" and filed to the China National Intellectual Property Administration on Jun. 21, 2023, each of which is incorporated herein in its entirety by reference.

TECHNICAL FIELD

Embodiments of the present application relate to the technical field of computers, and in particular, to a method for processing faulty memory module and apparatus, and an electronic device and a non-transitory readable storage medium.

BACKGROUND

Artificial intelligence and machine learning, high-performance computing, cloud and edge computing environment scenarios are complex and diverse. In order to meet the demands of all scenarios, a huge and expensive resource combination is required. In order to meet the increasing demand for resources, it is necessary to re-plan a server resource management architecture on the basis of a traditional server hardware architecture, so as to perform optimization and reconstruction on the basis of the traditional server architecture. In this regard, a hardware restructuring architecture solution for server resource pooling can be adopted. The server resource pooling mainly includes: a central processing unit processor (CPU) computing resource pool, a memory pool, a storage pool, and an input/output (I/O) port pool.

In a server resource pool, a memory resource pool is an indispensable part thereof. In a pooled memory environment, the identification and positioning of a faulty memory and emergency response after a fault are key points of memory resource maintenance. In the related art, when there is a fault in a memory module in the memory resource pool, the faulty memory module is generally replaced after power-down of the whole memory resource pool.

SUMMARY

According to embodiments of the present application there are provided a method for processing faulty memory module, including: acquiring a first power-down command, wherein the first power-down command is used for instructing a baseboard management controller of a memory resource pool to perform power-down processing on a faulty memory module in the memory resource pool; and in response to the first power-down command, a first memory module in the memory resource pool is in a fault state and is allowed to be powered down, sending a second power-down command to a target memory expander controller to which the first memory module belongs, wherein the second power-down command is used for instructing the target memory expander controller to perform power-down processing on the first memory module of a plurality of memory modules subordinate to the target memory expander controller.

According to embodiments of the present application, there is provided an apparatus for processing faulty memory module, including: an acquisition unit, configured to acquire a first power-down command, wherein the first power-down command is used for instructing a baseboard management controller of a memory resource pool to perform power-down processing on a faulty memory module in the memory resource pool; and a first sending unit, configured to, in response to the first power-down command, when a first memory module in the memory resource pool is in a fault state and is allowed to be powered down, send a second power-down command to a target memory expander controller to which the first memory module belongs, wherein the second power-down command is used for instructing the target memory expander controller to perform power-down processing on the first memory module.

According to embodiments of the present application, there is further provided a non-transitory readable storage medium which stores a computer program, wherein the computer program, when running, is configured to perform the steps in any one of the above method embodiments.

According to embodiments of the present application, there is further provided an electronic device, including a memory and a processor. The memory stores a computer program therein, and the processor is configured to run the computer program to execute the steps in any one of the above method embodiments.

BRIEF DESCRIPTION OF FIGURES

FIG. 1 is a block diagram of a hardware structure of a computer terminal for processing faulty memory module according to embodiments of the present application;

FIG. 2 is a flow diagram of a method for processing faulty memory module according to embodiments of the present application;

FIG. 3 is a schematic diagram of an alternative memory resource pool according to embodiments of the present application;

DETAILED DESCRIPTION

Figure 4:
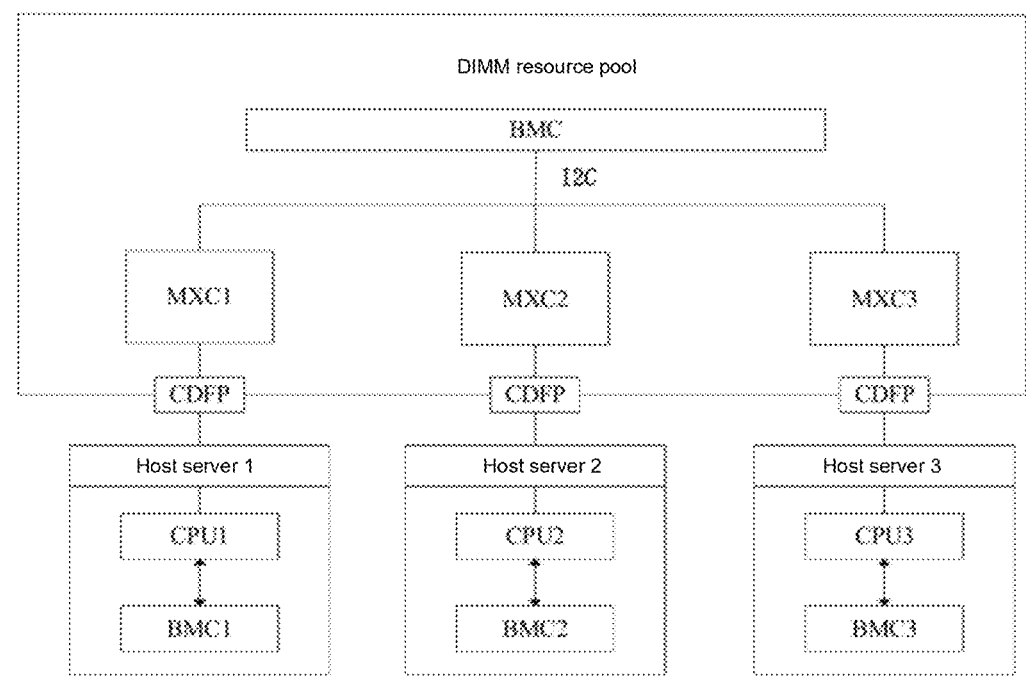
FIG. 4 is a schematic diagram of an alternative network architecture according to embodiments of the present application.

Embodiments of the present application will be described in detail below with reference to the drawings and in combination with the embodiments.

It should be noted that the terms "first", "second", and the like in the description of embodiments of the present application, the claims and the above drawings are used to distinguish between similar objects, and are not necessarily used to describe an alternative sequence or sequential order.

Figure 1:
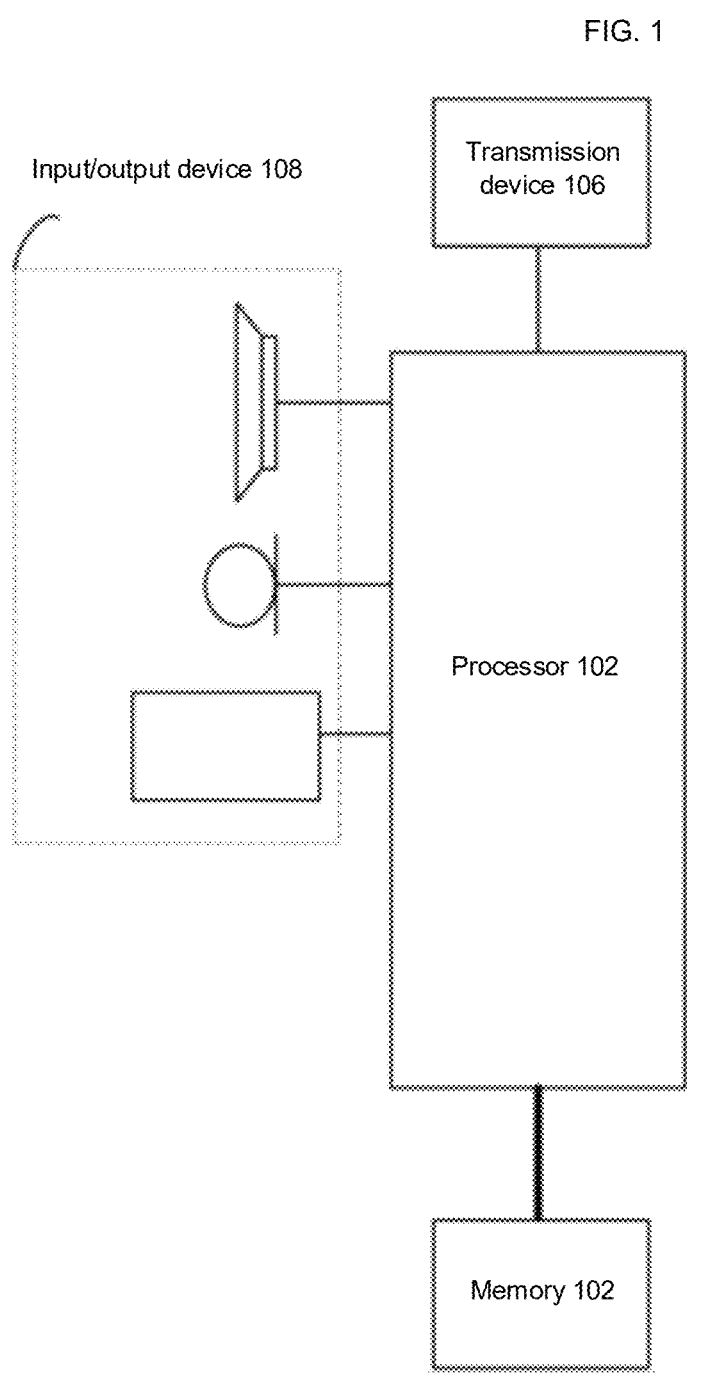

Method embodiments provided in the embodiments of the present application can be practiced in a mobile terminal, a computer terminal, or a similar computing apparatus. In an example where the method embodiments are practiced on the computer terminal, FIG. 1 is a block diagram of a hardware structure of a computer terminal for processing faulty memory module according to embodiments of the present application. As shown in FIG. 1, the computer terminal may include one or more (only one shown in FIG. 1) processors 102 (the processor 102 may include, but is not limited to, a processing apparatus such as a microprocessor unit MCU or a programmable logic device FPGA) and a memory 104 configured to store data, wherein the above computer terminal may further include a transmission device 106 configured to achieve a communication function and an input/output device 108. Those of ordinary skill in the art can understand that the structure shown in FIG. 1 is only illustrative, and is not intended to limit the structure of the above computer terminal. For example, the computer terminal may further include more or fewer components than those shown in FIG. 1, or have a different configuration from that shown in FIG. 1.

The memory 104 may be configured to store a computer program, such as a software program and module of application software, for example, a computer program corresponding to a method for processing faulty memory module in the embodiments of the present application. The processor 102 executes various functional applications and data processing by running the computer program stored in the memory 104, that is, implementing the above method. The memory 104 may include a high-speed random access memory, or may also include a non-transitory memory, such as one or more magnetic storage apparatuses, a flash memory, or other non-transitory solid-state memories. In some examples, the memory 104 may include memories which are disposed remotely relative to the processor 102, and these remote memories may be connected to the mobile terminal over a network. An example of the above network includes, but is not limited to, the Internet, an intranet, a local area network, a mobile communication network, and a combination thereof.

The transmission device 106 is configured to receive or send data over a network. The example of the above network may include a wireless network provided by a communication provider of the computer terminal. In an example, the transmission device 106 includes a Network Interface Controller (NIC), which may be connected to other network devices through a base station, so as to communicate with the Internet. In an example, the transmission device 106 may be a Radio Frequency (RF) module, which is configured to communicate with the Internet wirelessly.

With regard to related art for processing faulty memory module above, replacing the faulty memory module requires the power-down of the whole memory resource pool, which will affect all Host servers that use the memory resources in the memory resource pool, thus leading to a waste of memory resources. As may be seen, the method for processing faulty memory module in related art has the problem of a waste of resources due to the power-down of the whole memory resource pool.

According an aspect of the embodiments of the present application, there is provided a method for processing faulty memory module. In some examples where the method for processing faulty memory module in some embodiments is performed by a computer terminal, FIG. 2 is a flow diagram of a method for processing faulty memory module according to embodiments of the present application. As shown in FIG. 2, the flow includes the following steps:

At step S202, a first power-down command is acquired, wherein the first power-down command is used for instructing a baseboard management controller of a memory resource pool to perform power-down processing on a faulty memory module in the memory resource pool.

The method for processing faulty memory module in some embodiments may be applied to a scenario in which the faulty memory module in the memory resource pool is powered down and replaced. The memory resource pool may include one or more memory modules. The memory modules may be Dual-Inline-Memory-Modules (DIMMs), or may also be other types of memory modules, wherein the faulty memory module is a memory module of which the running condition is abnormal in the memory resource pool. The memory resource pool may be controlled by the Baseboard Management Controller (BMC) of the memory resource pool. The memory resource pool may implement information acquisition and power-up/down management of the memory module by a Memory Expander Controller (MXC). Here, the BMC of the memory resource pool may be connected to the MXC through an Inter-Integrated Circuit (I2C), memory module information is acquired through the interaction between the I2C and MXC firmware, and the power-up/down of a corresponding subordinate memory may also be controlled through the interaction between an I2C command and the MXC firmware. Here, the number of the MXCs connected to the BMC of the memory resource pool may be one or more, and the number of the memory modules belonging to the same MXC may also be one or more. Power-down may refer to stopping supplying power to the faulty memory module in the memory resource pool, or may also refer to other operations.

For example, as shown in FIG. 3, the memory resource pool is a DIMM resource pool (i.e., a DIMM pool). The BMC of the DIMM resource pool is connected to three MXC firmwares (i.e., MXC1, MXC2, and MXC3) through the I2C, such that the information of the memory module subordinate to each MXC is acquired through the interaction between the I2C and each MXC firmware. The memory modules subordinate to each MXC firmware are four DIMMs. Among the four DIMMs subordinate to the MXC2, there is one DIMM (ERR), that is, the faulty memory module.

It should be noted that a hardware restructuring architecture solution for server resource pooling can realize dynamic allocation of resources, such that a utilization rate of server hardware resources can be greatly increased, and the operation and maintenance cost of a single server is reduced. In the server resource pool, the memory resource pool (or referred to as a memory pool) is an indispensable part thereof. The memory resource pool may be used as a memory resource used by a computing device in a computing resource pool. The computing resource pool may include a group of computing devices, such as a group of Host servers. Each Host server may use one or more memory modules in the memory resource pool (i.e., one or more memory modules are used as the memory resource), and the memory modules used by different Host servers may be different.

Since the expansion capabilities of the memory and I/O lag far behind the growth of computing density, the rapid development of heterogeneous computing is seriously hindered. As the computing density becomes higher and higher, memories and bandwidths averaged to each core continue to decrease accordingly. In this regard, a platform used in some embodiments implements memory pull-away by using a cache coherence bus of a Compute Express Link (CXL), so as to solve the current problems of insufficient memory modules and large capacity requirements. The platform here may be a platform which allocates and manages the memory resource in the memory resource pool. The MXC may be connected to the Host server (e.g., the BMC of the Host server) through the CXL bus, such that the Host server may use the memory resource (e.g., the memory modules) in the memory resource pool.

Alternatively, one MXC may be connected to one or more Host servers, such that the Host servers may access and use the memory module resource subordinate to the corresponding MXC. The MXC and the Host server may be connected by adapter-coupling the CXL bus of the memory resource pool to a 400 Gbps form-factor pluggable module (CDFP) interface, so as to allow the computing resource pool to connect and use the memory resource. Alternatively, the memory resource pool and the computing resource pool may also be connected in other ways, which is not limited in some embodiments. Here, each Host server may include a CPU, a BMC, or other devices, wherein the CPU and BMC in the Host server may interact with each other through a low pin count bus (LPC). For example, the LPC may connect the BMC of the Host server to a Basic Input Output System (BIOS) in the CPU of the Host server. The CPU and the BMC may also interact with each other in other ways. Here, the Host server may represent a local computer which can access other machines in a mutual manner, may also represent a device or application program which provides services for other software and hardware, or may also represent other servers.

For example, as shown in FIG. 4, the MXC in the memory resource pool is connected to one or more Host servers through the CDFP interface. In this case, the Host server may acquire the memory module resource subordinate to the MXC, wherein the CPU and BMC in the Host server may interact with each other through the LPC bus.

For ease of information interaction between the BMC of the memory resource pool and the BMC of the Host server, the BMC of the memory resource pool and the BMC of the computing resource pool (i.e., the Host server) may be connected to one network switch (dedicated management port networks of the BMC of the memory resource pool and the BMC of the computing resource pool both are connected to one network switch to achieve network interconnection), thereby achieving network interconnection. The BMC of the memory resource pool and the BMC of the computing resource pool may be connected to the network switch in a variety of ways, for example, over a Local Area Network (LAN), or may also be connected by other means.

In another scenario, for example, in a Compute Express Link Switch (CXL Switch) scenario, the memory resource pool is located on a memory resource pool server. A CXL Switch server node is added between the memory resource pool server and the Host server. The memory resource pool server is connected to the baseboard management controller of the host server corresponding to each memory module in the memory resource pool through a CXL switch server. The CDFP (a form of packaging) interface of the memory resource pool server is uniformly connected to the CXL Switch server (the CXL bus of the memory may be adapter-coupled to the CDFP interface for the computing resource pool to connect and use the memory resource). The CXL Switch server is then connected to the Host server, and the CXL Switch node uniformly allocates the memory resource (i.e., the CXL switch server is configured to allocate the memory resource to the host server corresponding to each memory module), and provides a memory service to the Host server. In this case, the memory resource used by the Host server may be dynamically allocated by the CXL Switch.

Figure 5:
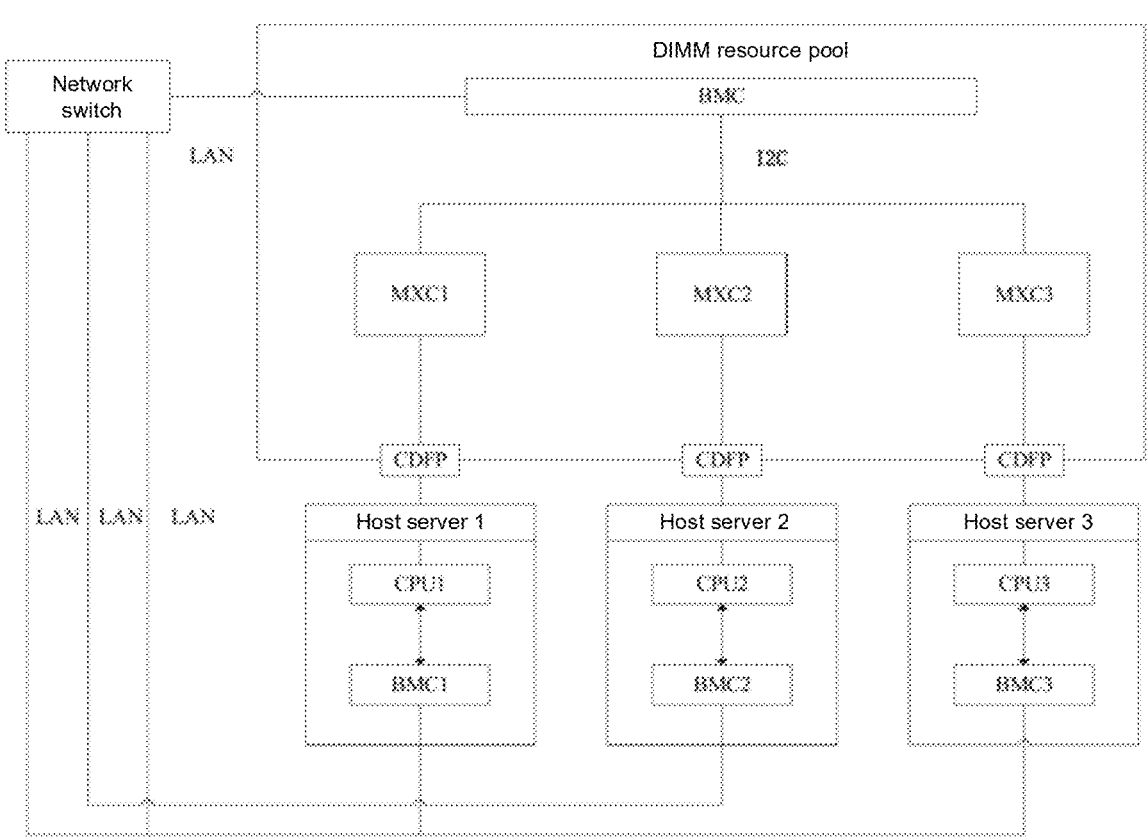
FIG. 5 is a schematic diagram of another alternative network architecture according to embodiments of the present application.

For example, the network architecture including the DIMM resource pool, the Host server, and the network switch may be as shown in FIG. 5. The memory is pooled to a memory resource pool server. Each memory pool server has multiple groups of memories that are centrally controlled through the MXC. Each group of memories is connected to the CDFP interface for external connection through the MXC. The Host server may be connected to a CDFP port as a computing resource pool node, and thus can access and use the CXL memory resource connected to a corresponding MXC chip. Therefore, memory pull-away is realized. In this scenario, a Host uses the memory resource connected to the CDFP interface.

The CDFP interface of the memory resource pool server is uniformly connected to the CXL Switch server. The CXL Switch server is then connected to the Host server. The CXL Switch node uniformly allocates the memory resource, and provides the memory service to the Host Server. In this scenario, the memory resource used by the Host may be dynamically allocated by the CXL Switch.

In the related art, when there is a memory module with an abnormal running condition in the memory resource pool, overall power-down is generally performed, and then the memory module with the abnormal running condition is replaced, and overall power-up is then performed after replacement. The above method of replacing a faulty memory module may affect all the Host servers which use the memory resource in the memory resource pool, thus leading to a waste of memory resources. Therefore, how to repair and replace a faulty memory as much as possible without affecting a service function of the memory resource pool is a problem that needs to be solved to ensure the normal running of services under a pooled resource architecture.

In order to at least partially solve the above problem, in some embodiments, a single node may control the faulty memory module to power down. For example, in the memory resource pool, memory information acquisition and power-up/down management are implemented by the MXC: when the first memory module in the memory resource pool is in the fault state and is allowed to be powered down, the BMC in the memory resource pool may instruct the MXC to which the faulty memory module belongs to perform power-down processing on the faulty memory module by issuing a power-down command. After the faulty memory module is powered down individually, maintenance personnel may replace the faulty memory module which has been powered down. Since there is no need to perform overall power-down to replace the faulty memory module, the normal running of the services on the Host server using other memory modules in the memory resource pool is not affected, thereby avoiding a waste of resources, and improving the execution efficiency of system services. Here, the control of the faulty memory module by the single node means that the faulty memory module is controlled individually without controlling other nodes, such that the normal running of the services on other nodes is not affected. Here, by providing a solution that may realize faulty memory replacement without power-down of the whole memory pool, the maintenance stress of operation and maintenance personnel may be reduced, a service impact caused by memory faults is minimized, and there is no need to power down the whole memory resource pool to avoid affecting all Host servers using the memory resource in the memory pool.

The BMC of the memory resource pool may acquire the first power-down command. The first power-down command may be used for instructing the baseboard management controller of the memory resource pool to perform power-down processing on the faulty memory module in the memory resource pool. The first power-down command may carry identification information of a memory module to be powered down, thereby indicating the memory module to be powered down. Alternatively, the first power-down command may not carry the identification information of the memory module, thereby instructing the BMC of the memory resource pool to voluntarily determine the faulty memory module and perform power-down processing on the faulty memory module. The identification information of the memory module carried in the first power-down command may include identification information of one or more memory modules, such that the identification information may indicate power-down processing for the one or more memory modules.

Alternatively, the first power-down command may be acquired in one or more ways, which may include, but are not limited to, at least one of: receiving the first power-down command from a control device, or automatically generating the first power-down command. In the scenario in which the first power-down command is received from the control device, the BMC of the memory resource pool or other components may record error information of the faulty memory module in the memory resource pool through a log or in other forms, such that the operation and maintenance personnel may determine that there is a fault in the memory module in the memory resource pool by checking the error information, the operation and maintenance personnel then issue a power-down command to the control device, and the scenario may also be other scenarios. In the scenario in which the first power-down command is automatically generated, the BMC of the memory resource pool may periodically detect its own memory module, and if a memory module in a fault state is detected, the power-down command may be issued automatically, and the scenario may also be other scenarios. The above first power-down command may be an Intelligent Platform Management Interface (IPMI) command, or may also be other commands.

At step S204, in response to the first power-down command, the first memory module in the memory resource pool is in the fault state and is allowed to be powered down, a second power-down command is sent to a target memory expander controller to which the first memory module belongs, wherein the second power-down command is used for instructing the target memory expander controller to perform power-down processing on the first memory module.

After the baseboard management controller of the memory resource pool receives the first power-down command, and if the first memory module in the memory resource pool meets certain conditions, the baseboard management controller of the memory resource pool may issue an execution command to the target memory expander controller to which the first memory module belongs. The first memory module in the memory resource pool meets the certain conditions, wherein the above conditions may be the condition that the first memory module in the memory resource pool is in the fault state and is allowed to be powered down, or may also be other conditions. Issuing the execution command to the target memory expander controller to which the first memory module belongs may be to allow the baseboard management controller of the memory resource pool to send the second power-down command to the target memory expander controller to which the first memory module belongs, or may also be other operations. Here, when the first memory module is in the fault state, it may be that the memory module has no display or has abnormal display when being powered on, or that the memory module gives an audible alarm, or other situations, which are not limited in some embodiments. Here, the situation in which the first memory module is allowed to be powered down may be that the Host server is in a disconnected or power-off state, or may also be other situations. The number of the first memory modules may be one or more, and the number of the target memory expander controllers to which the corresponding first memory modules belong may also be one or more.

The second power-down command may instruct the target memory expander controller to perform power-down processing on the first memory module, or may also indicate other operations. The second power-down command above may be a System Management Bus (SMBus) command, an Inter-Integrated Circuit (I2C) command, or other commands, which is not limited in some embodiments. The baseboard management controller of the memory resource pool and the target memory expander controller to which the first memory module belongs may interact with each other through the SMBus command based on a SMBus, interact with each other through the I2C command based on an I2C bus, or interact with each other by other means.

Here, in response to a memory module is faulty and needs to be replaced, the single node may control the faulty memory module to power off without affecting the normal running of services of other nodes. Faulty memory replacement may be realized without power-down of the whole memory pool, such that the maintenance stress of the operation and maintenance personnel may be reduced, a service impact caused by memory faults is minimized, and there is no need to power down the whole memory resource pool to avoid affecting all Host servers using the memory resource in the memory pool. Here, the memory module being faulty and needing to be replaced may be determined by monitoring health state information of a memory by the BMC of the memory resource pool, or determined by other means, which is not limited in some embodiments.

As examples, when it is detected that a fatal error of the memory affects the services of the Host server, the memory module needs to be replaced for maintenance. The BMC of the memory resource pool may control the subordinate memory module to power down through interaction with the MXC. In this process, the normal use of other MXCs and memories is not affected, that is, the normal use of CXL memory resources by other Host servers connected to the memory resource pool server is not affected.

Through steps S202-S204, the first power-down command is acquired, wherein the first power-down command is used for instructing the baseboard management controller of the memory resource pool to perform power-down processing on the faulty memory module in the memory resource pool; in response to the first power-down command, when the first memory module in the memory resource pool is in the fault state and is allowed to be powered down, the second power-down command is sent to the target memory expander controller to which the first memory module belongs, wherein the second power-down command is used for instructing the target memory expander controller to perform power-down processing on the first memory module. Therefore, the problem of a waste of resources caused by power-down of the whole memory resource pool in method for processing faulty memory modules in the related art is solved, a waste of resources may be avoided, and the efficiency of system services is improved, thereby reducing the stress of the operation and maintenance personnel.

In some example embodiments, acquiring a first power-down command includes:

At S11, the first power-down command sent by the control device is received, wherein the first power-down command carries position information of the first memory module, the position information of the first memory module is used for indicating a position of the first memory module in the memory resource pool, and the first power-down command is used for instructing the baseboard management controller of the memory resource pool to perform power-down processing on the first power-down command.

In some embodiments, the first power-down command may be automatically generated by the baseboard management controller of the memory resource pool. In order to improve the rationality of replacement of the faulty memory module and avoid an impact on service running due to the power-down of the faulty memory module, in some embodiments, an administrator or other relevant personnel may manually trigger the control device to send the first power-down command to the baseboard management controller of the memory resource pool based on the known faulty memory module. The baseboard management controller of the memory resource pool may receive the first power-down command sent by the control device. The first power-down command may be used for instructing the baseboard management controller of the memory resource pool to perform power-down processing on the first memory module.

Here, the first power-down command may carry one or more pieces of information, which may include: memory module position information which is used for indicating the position of the first memory module to be powered down in the memory resource pool. Furthermore, the information may also include other information related to the power-down of the first memory module, for example, power-down condition indication information, that is, a condition that need to be met to power down the first memory module. The information may be power-down time indication information, or other types of indication information, which is not limited in some embodiments.

For example, when replacing the faulty memory module, the maintenance personnel may inform the BMC of the memory resource pool to power down the faulty memory module through an IPMI command, and then replace the faulty memory module.

In some embodiments, the control device sends the power-down command to the baseboard management controller of the memory resource pool to indicate power-down processing for the faulty memory module, such that the rationality and controllability of the replacement of the faulty memory module may be improved.

In some example embodiments, after acquiring the first power-down command, the method further includes:

at S21, the position information of the first memory module is extracted from the first power-down command; and at S22, the first memory module to be powered down is determined based on first position information and second position information.

In some embodiments, the first power-down command may carry the position information of the first memory module, and the position information of the first memory module is used for indicating the position of the first memory module to be powered down in the memory resource pool. All memory modules in the memory resource pool may be positioned uniformly, and in this case, all the memory modules in the memory resource pool may be numbered uniformly. In order to improve the convenience of the positioning of the memory module, the memory module may also be positioned according to a memory expander controller to which the memory module belongs and the position of the memory module in the memory expander controller to which the memory module belongs, and in this case, the memory modules in the memory resource pool may be numbered according to the memory expander controllers to which the memory modules belong.

Correspondingly, the position information of the memory module may include two portions, that is, one portion of the position information may be used for indicating a position of the memory expander controller to which the memory module belongs among a plurality of memory expander controllers connected to the baseboard management controller of the memory resource pool, and the other portion of the position information may be used for indicating the position of the memory module in the memory expander controller to which the memory module belongs. For the first memory module, the baseboard management controller of the memory resource pool may extract the position information of the first memory module from the first power-down command. Here, the memory expander controller to which the first memory module belongs is the target memory expander controller. The position information of the first memory module may include: the first position information, which is used for indicating a position of the target memory expander controller among the plurality of memory expander controllers connected to the baseboard management controller of the memory resource pool; and the second position information, which is used for indicating a position of the first memory module in the target memory expander controller. There may be one or more first memory modules, and the position information of each first memory module may be extracted from the first power-down command.

After the first position information and the second position information are extracted, the first memory module to be powered down may be positioned based on the first position information and the second position information, thereby determining the first memory module to be powered down. For a scenario in which there are a plurality of first memory modules, each first memory module may be positioned according to the position information of each first memory module. The positioning mode of each first memory module may be similar, which is repeated along longer in some embodiments.

For example, as shown in FIG. 3, a faulty DIMM is the second one of the DIMMs in the MXC2. A BMC of the DIMM resource pool may extract memory position information from the received IPMI command. The memory position information is used for indicating a position of a DIMM to be powered down, that is, which DIMM subordinate to which MXC, thereby achieving the precise positioning of the DIMM to be powered down.

In some embodiments, the memory module to be powered down is positioned based on the position of the memory expander controller to which the memory module to be powered down belongs and the position of the memory module to be powered down in the memory expander controller to which the memory module to be powered down belongs, such that the accuracy and convenience of the positioning of the memory module to be powered down may be improved.

In some example embodiments, after acquiring the first power-down command, the method further includes:

at S31, in response to the first power-down command, when the first memory module is in the fault state but is not allowed to be powered down, first power-down abnormity indication information is sent to the control device, wherein the first power-down abnormity indication information is used for indicating that power-down of the first memory module fails due to the first memory module being not allowed to be powered down; and at S32, when the first memory module is in a normal state, second power-down abnormity indication information is sent to the control device, wherein the second power-down abnormity indication information is used for indicating that the power-down of the first memory module fails due to the first memory module being in the normal state.

After the first power-down command is received, the baseboard management controller of the memory resource pool may determine whether the first memory module needs to be powered down and whether the first memory module can be powered down according to a memory module state of the first memory module. For different memory module states, operations performed by the baseboard management controller of the memory resource pool may be different. For example, in response to the first power-down command, if the first memory module is in the fault state but is allowed to be powered down, an operation of powering down the first memory module may be continued to perform. After the first memory module is successfully powered down or fails to be powered down, a memory module power-down result may be sent to the control device to indicate whether the first memory module is successfully powered down.

In some embodiments, if the first memory module is in the fault state but is not allowed to be powered down, the baseboard management controller of the memory resource pool may wait for a period of time and then re-determine whether the first memory module is allowed to be powered down. Alternatively, the baseboard management controller of the memory resource pool may also directly send the first power-down abnormity indication information to the control device, or send the first power-down abnormity indication information to the control device after determining that the first memory module is not allowed to be powered down for multiple times, so as to indicate that power-down of the first memory module fails due to the first memory module being not allowed to be powered down.

In some embodiments, if the first memory module is in the normal state, that is, the first memory module has no fault, it may be determined that power-down processing does not need to be performed on the first memory module, and the baseboard management controller of the memory resource pool may ignore the first power-down command. Alternatively, the baseboard management controller of the memory resource pool may send second power-down abnormity indication information to the control device to indicate that the power-down of the first memory module fails due to the first memory module being in the normal state.

Here, the situation that the first memory module is in the fault state but is not allowed to be powered down may be that the Host server corresponding to the first memory module is powered off or powered down, or may also be other situations. The first power-down command may carry description information which is used for indicating the reason for power-down of the first memory module, such that the baseboard management controller of the memory resource pool determines that the first memory module does not need to be powered down when being in the normal state based on the description information. Alternatively, regardless of whether the first memory module is in the normal state, the baseboard management controller of the memory resource pool may perform power-down processing on the first memory module.

In some embodiments, whether the first memory module needs to be powered down and whether the first memory module can be powered down are determined according to the memory module state of the first memory module, such that the flexibility of power-down of the memory module may be improved.

In some example embodiments, after acquiring the first power-down command, the method further includes:

at S41, a memory module in a fault state in the memory resource pool is determined according to memory module fault information recorded by the baseboard management controller of the memory resource pool, wherein the memory module fault information is fault information which is recorded when the memory module in the fault state is detected and which corresponds to the memory module in the fault state.

When the memory module in the fault state is detected, the baseboard management controller of the memory resource pool may record the faulty memory module in the fault state through the memory module fault information. The memory module fault information may also record fault-associated information of the faulty memory module, such as a fault type and fault time. The memory module in the fault state in the memory resource pool may be determined according to the memory module fault information. Alternatively, the memory module fault information above may include error information of the memory module.

In some embodiments, the first power-down command may only indicate the power-down processing of the faulty memory module without specifying the faulty memory module to be powered down. In this case, the baseboard management controller of the memory resource pool may determine the memory module in the fault state in the memory resource pool according to the memory module fault information recorded by the baseboard management controller of the memory resource pool. In examples where the memory module fault information is used for recording the error information and position of the memory module in the fault state, according to the memory module fault information, the faulty memory module in the memory resource pool, as well as an error content and position of the faulty memory module, may be determined.

Alternatively, the memory module fault information may be recorded in one or more forms, wherein the memory module fault information may be recorded in the form of a log, or may also be recorded in other ways. For example, the log above may be a System Event Log (SEL) log, or other logs.

In some embodiments, fault information corresponding to the faulty memory module is recorded when the faulty memory module is detected, and after the power-down command is received, the faulty memory module to be powered down is determined based on the recorded fault information, such that the convenience of the positioning of the faulty memory module is improved.

In some example embodiments, after acquiring the first power-down command, the method further includes:

at S51, a state verification command is sent to the target memory expander controller, wherein the state verification command is used for instructing the target memory expander controller to verify a fault state of a target memory module; and at S52, a first response message sent by the target memory expander controller in response to the state verification command is received, wherein the first response message is used for indicating whether the target memory module is in the fault state.

Before power-down processing is performed on the target memory module, whether the target memory module is in the fault state, that is, whether the target memory module is the faulty memory module, may be verified by the target memory expander controller. When the fault state of the target memory module is verified, the baseboard management controller of the memory resource pool may send the state verification command to the target memory expander controller, so as to instruct the target memory expander controller to verify whether the target memory module is in the fault state. The state verification command may be any command that may be transmitted between the baseboard management controller of the memory resource pool and the memory expander controller, and may be, but is not limited to, an I2C command.

In response to the received state verification command, the target memory expander controller may verify whether the target memory module is in the fault state. The verification method may be to send a verification data packet to the target memory module, and determine whether the target memory module is in the fault state based on whether a response data packet returned by the target memory module is received, or may also be other verification methods. In some embodiments, the verification method of memory module faults is not limited. Based on a verification result, the target memory expander controller may send the first response message to the baseboard management controller of the memory resource pool, so as to indicate whether the target memory module is in the fault state. The baseboard management controller of the memory resource pool may determine whether the target memory module is in the fault state based on the received first response message.

Here, when some memory nodes are powered down, a memory power-off protection mechanism is added: only after the BMC of the memory resource pool identifies that the memory fault is true, and the Host server connected to the faulty memory has been powered off or powered down, the BMC can perform power-down processing on the faulty memory module, such that the accidental power-down of the memory may be prevented from affecting the normal running of services.

In some embodiments, the fault state of the memory module is verified by interacting with the memory expander controller to which the memory module belongs, such that the accuracy of power-down of the memory module may be improved.

In some example embodiments, after acquiring the first power-down command, the method further includes:

at S61, a state acquisition command is sent to the baseboard management controller of the host server corresponding to the target memory module, wherein the state acquisition command is used for acquiring a power-on/off state of the host server corresponding to the target memory module;

at S62, a second response message returned by the baseboard management controller of the host server corresponding to the target memory module in response to the state acquisition command is received, wherein the second response message is used for indicating the power-on/off state of the host server corresponding to the target memory module; and at S63, when the power-off state of the host server corresponding to the target memory module is determined according to the second response message, it is determined that the target memory module is allowed to be powered down.

In addition to the memory module being in the fault state, the condition that the memory module is allowed to be powered down may also include: the Host server connected to the memory module being in a power-off state, that is, the Host server connected to the faulty memory has been powered off or powered down. Here, the Host server being in the power-on/off state may mean that a host of the Host server has been powered off or powered down. After the first power-down command is acquired, the baseboard management controller of the memory resource pool may send the state acquisition command to the baseboard management controller of the host server corresponding to the target memory module, so as to request to acquire the power-on/off state of the host server corresponding to the target memory module.

After the baseboard management controller of the host server corresponding to the target memory module receives the state acquisition command, the power-on/off state of the current host server may be confirmed. The state acquisition command may be the I2C command, or may also be other commands that can be transmitted between the baseboard management controller of the memory resource pool and the baseboard management controller of the host server. The baseboard management controller of the memory resource pool may receive the second response message returned by the baseboard management controller of the host server corresponding to the target memory module in response to the state acquisition command. The second response message is used for indicating the power-on/off state of the host server corresponding to the target memory module.

According to the second response message, it may be determined whether the host server corresponding to the target memory module is in the power-off state, and if the host server is in the power-off state, the baseboard management controller of the memory resource pool may determine that the target memory module is allowed to be powered down.

For example, as shown in Table 1, the condition that the memory module is allowed to be powered down includes: the memory module being in the fault state, and the Host server corresponding to the memory module is being the power-off state (or a power-down state):

TABLE 1

|  | Memory module in fault state | Memory module in normal state |
| --- | --- | --- |
| Host server corresponding to memory module in power-on state | Allowed to power down | Not allowed to power down |
| Host server corresponding to memory module in power-off state | Not allowed to power down | Not allowed to power down |

As shown in Table 1, the memory module is only allowed to be powered down when the memory module is in the fault state and the Host server connected to the faulty memory module has been powered off or powered down.

Alternatively, when the memory module is powered down, a faulty memory power-down IPMI command provided by the BMC of the memory resource pool may verify a memory fault state and a Host connection state, and after it is verified that it is a faulty memory and the correspondingly-connected Host server has been powered off, power-down processing is then performed on the faulty memory through interaction with the MXC. Here, the BMC of the memory resource pool and the BMC of the Host server are connected to a same network switch. The BMC of the memory resource pool acquires a power-on/off state of each Host node over a network, and can check whether a host BMC receives memory abnormity fault warning information sent by a host BIOS.

It should be noted that the BMC of the memory resource pool positions the memory module through the memory position information provided by the IPMI command. The BMC of the memory resource pool determines a fault state of a memory by checking whether the memory is in an abnormal state. The BMC of the memory resource pool may also send a Redfish command over the network to access the Host BMC corresponding to the memory module, so as to acquire a power-on/off state of a host system. When the BMC of the memory resource pool can verify that the memory module is indeed faulty, and the corresponding Host has been powered off without leading to an abnormal loss of Host data due to power-down of the memory module, the BMC then interacts with the MXC to perform a power-down operation on the faulty memory.

In some embodiments, by interacting with the BMC of the Host server corresponding to the memory module, whether the Host server corresponding to the memory module has been powered off or powered down is determined, so as to determine whether the memory module is allowed to be powered down, such that the accuracy of power-down of the faulty memory module may be improved.

In some example embodiments, in response to the first power-down command, when a first memory module in the memory resource pool is in a fault state and the first memory module is allowed to be powered down, sending a second power-down command to a target memory expander controller to which the first memory module belongs includes:

at S71, in response to the first power-down command, when the first memory module in the memory resource pool is in the fault state and is allowed to be powered down, a second power-down command is sent to the target memory expander controller to which the first memory module belongs, and a third power-down command is sent to a memory expander controller to which a memory module in a same memory group as the first memory module belongs.

In some embodiments, in a CXL Switch scenario, the memory modules in the memory resource pool are allocated to the host server in the form of a memory group. Single node power-down processing may be performed on the faulty memory module in the following manner: virtualizing a memory group (i.e., a memory module group) actually used by the Host server through the BMC, and performing power-down processing on the memory modules to which the memory group belongs through the MXC. For the first power-down command, in response to the first power-down command, the faulty memory module in the memory resource pool may be determined in a similar manner to the foregoing embodiments. The determined faulty memory module may include the first memory module. The memory expander controller to which the first memory module belongs is the target memory expander controller. The first memory module is a memory module in a memory module group. The first memory module may be the foregoing target memory module.

When power-down processing is performed on the first memory module, the second power-down command may be sent to the target memory expander controller to indicate power-down processing of the first memory module. At the same time, the third power-down command may be sent to the memory expander controller to which the memory module in the same memory group as the first memory module belongs, so as to instruct the memory expander controller belonging to the memory module in the same group to perform power-down processing on the memory module in the same group. Alternatively, if there are at least two memory modules in the memory group to which the first memory module belongs belong to the same memory expander controller, power-down processing of each memory may be indicated through different power-down commands, or power-down processing of all memory modules that need to be powered down under the same memory expander controller may also be indicated through one power-down command, and some embodiments is not limited thereto.

In some embodiments, by sending the power-down command to the memory expander controller to which each memory module belongs in the memory module group to which the faulty memory module belongs, so as to power down the plurality of memory modules in the memory module group to which the faulty memory module belongs, the safety of service running may be improved.

In some example embodiments, before power-down processing is performed on the first memory module, the target host server corresponding to the first memory module is in a power-off state. The method of determining that the target host server is in the power-off state is similar to the foregoing embodiment, and thus is not repeated along longer herein. After power-down processing is performed on the first memory module, the maintenance personnel may replace the first memory module, so as to obtain a new first memory module, which is the first memory module which has been replaced. At the same time, the first memory module which has been replaced may be triggered to be powered up such that the first memory module may be incorporated in the memory resource pool and used by the Host server.

Correspondingly, after sending the second power-down command to the target memory expander controller to which the first memory module belongs, the method further includes:

at S81, a first power-up command is received, wherein the first power-up command is used for indicating power-up processing for the first memory module which has been replaced; and at S82, in response to the first power-up command, collaborative power-up processing is performed on the first memory module and the target host server.

The baseboard management controller of the memory resource pool may receive the first power-up command, and the first power-up command is used for indicating power-up processing for the first memory module which has been replaced. The first power-up command may be received from the control device. The control device sends the first power-up command in a manner similar to that of sending the first power-down command, which is not repeated along longer herein, wherein the first power-up command may be an IPMI command, or may also be other commands. In response to the received first power-up command, the baseboard management controller of the memory resource pool may perform power-up processing on the first memory module. The power-up processing on the first memory module may be performed by the memory expander controller to which the first memory module belongs.

Alternatively, the power-up of the memory module related to the memory resource pool may cooperate with the Host server. For the target host server, the target host server may be controlled to be powered up in coordination with the first memory module to ensure that a service on the target host server may run safely. The power-up processing of the target host server may be performed by the baseboard management controller of the memory resource pool, or may also be performed by the memory expander controller to which the first memory module belongs. Some embodiments is not limited thereto.

For example, after the replacement of the faulty memory module is completed, the maintenance personnel may send the IPMI command (the IPMI command may include the position information of the memory module) to inform the BMC of the memory resource pool that the faulty memory module has been replaced, and the BMC of the memory resource pool controls a power-up timing sequence of the memory modules subordinate to an MXC chip and the corresponding Host servers.

In some embodiments, by performing collaborative power-up processing on the replaced memory module and the Host server using the replaced memory module based on the received power-up instruction, the safety and efficiency of service running may be improved.

In some example embodiments, in response to the first power-up command, performing collaborative power-up processing on the first memory module and the target host server includes:

at S91, in response to the first power-up command, a first out-of-band control instruction is sent to a baseboard management controller of the target host server, wherein the first out-of-band control instruction is used for indicating power-up processing for the target host server;

at S92, a third response message returned by the baseboard management controller of the target host server in response to the first out-of-band control instruction is received, and a second power-up command is sent to the target memory expander controller, wherein the third response message is sent after the target host server is powered up to a suspend-to-memory state, and the second power-up command is used for indicating power-up processing for the first memory module; and at S93, after the first memory module is powered up, a second out-of-band control instruction is sent to the baseboard management controller of the target host server, wherein the second out-of-band control instruction is used for indicating continuous power-up processing for the target host server such that the target host server switches from the power-off state to a power-on state.

Figure 6:
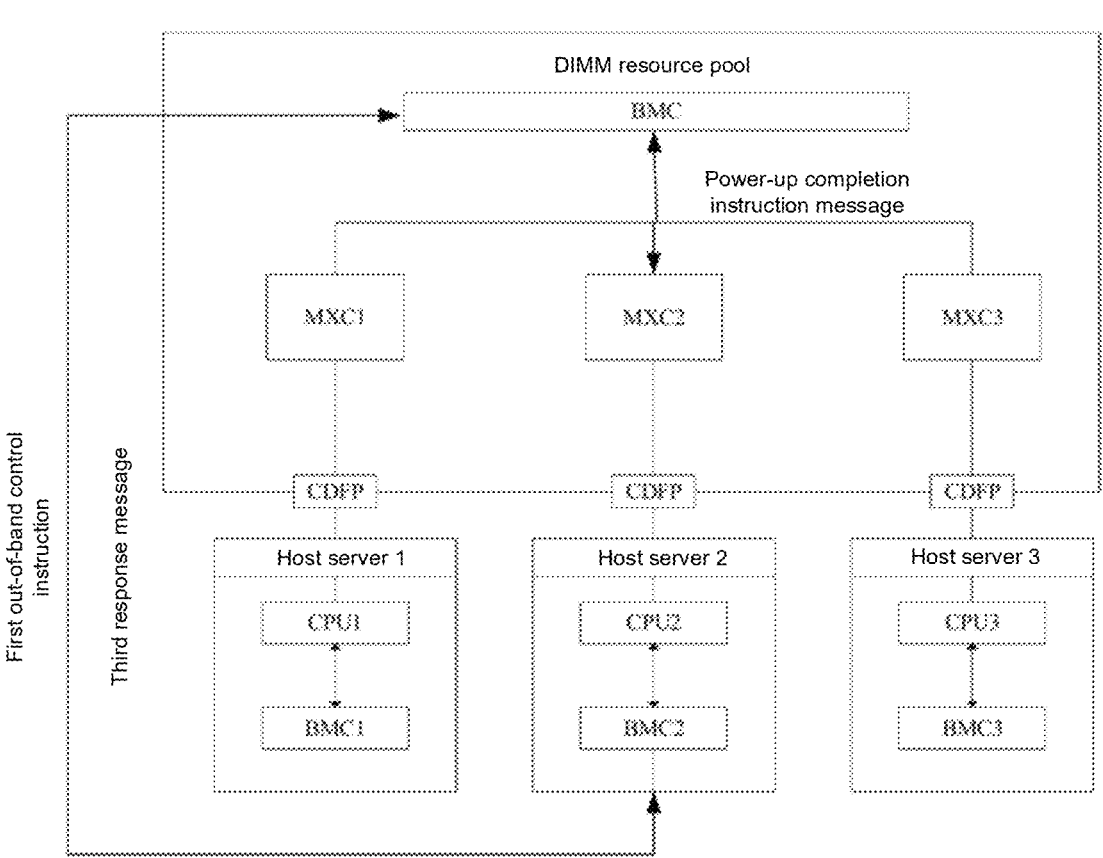
FIG. 6 is a schematic diagram of an alternative method for processing faulty memory module according to embodiments of the present application.

When collaborative power-up processing is performed on the first memory module and the target host server, collaborative power-up with the memory module of the memory resource pool may be completed before a BIOS of the Host server runs to a memory training stage. In this case, the Host server may be started first. The baseboard management controller of the memory resource pool may send the first out-of-band control instruction (as shown in FIG. 6) to the baseboard management controller of the target host server, so as to indicate the power-up processing for the target host server. The first out-of-band control instruction may be sent through an out-of-band management interface provided by the target host server. The out-of-band management interface may be a Redfish (redfish interface). The first out-of-band control instruction may be a Redfish command.

In response to the received first out-of-band control instruction, the target host server may perform power-up processing. After the target host server is powered up or when the target host server is powered up to a state associated with a memory, the third response message (as shown in FIG. 6) is sent to the baseboard management controller of the memory resource pool, so as to indicate that the target host server has been powered up to the state associated with the memory. The state associated with the memory may be a suspend-to-memory state. In response to the received third response message, the baseboard management controller of the memory resource pool may send the second power-up command to the target memory expander controller, so as to indicate the power-up processing for the first memory module.

Figure 7:
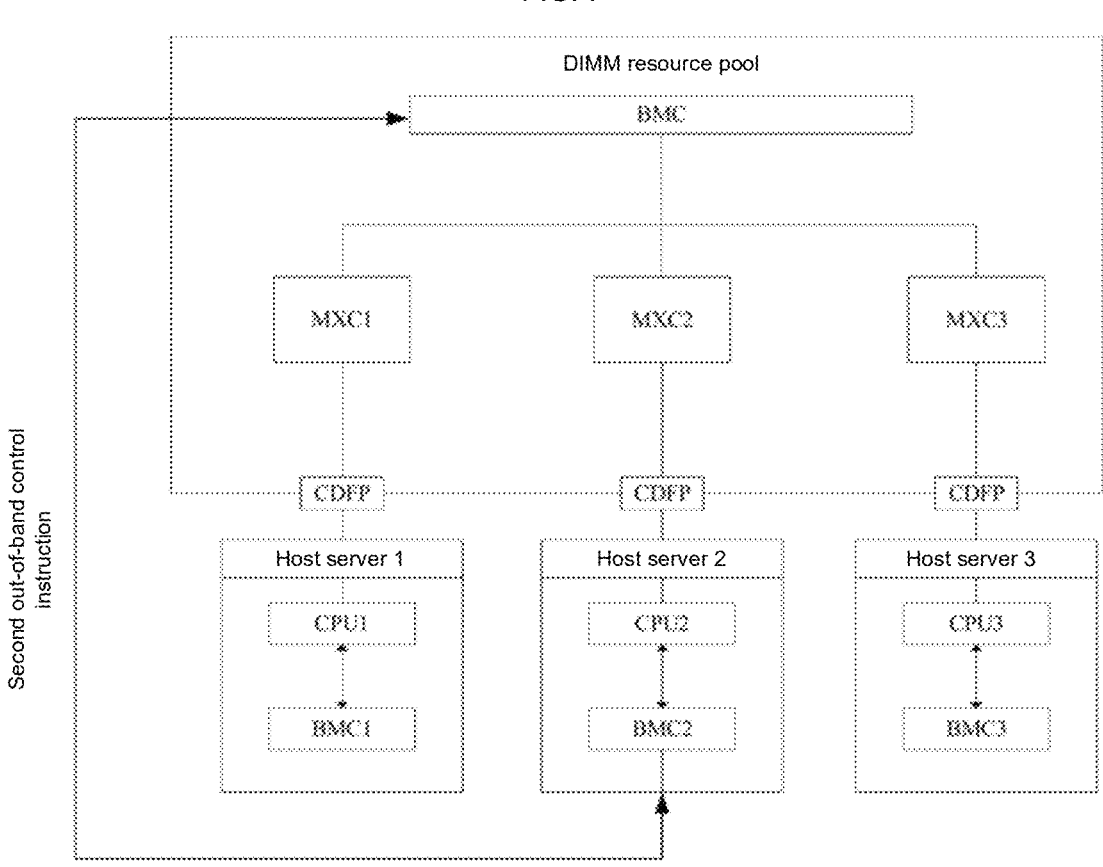
FIG. 7 is a schematic diagram of another alternative method for processing faulty memory module according to embodiments of the present application.

After the second power-up command is received, the target memory expander controller may perform power-up processing on the first memory module. After the first memory module is powered up, an indication message (as shown in FIG. 6) that is used for indicating that the first memory module has been powered up may be sent to the baseboard management controller of the memory resource pool. In this case, the baseboard management controller of the memory resource pool may send the second out-of-band control instruction (as shown in FIG. 7) to the baseboard management controller of the target host server, so as to indicate continuous power-up processing for the target host server, thereby controlling the target host server to switch from the power-off state to the power-on state, that is, from the suspend-to-memory state to a power-up completion state.

For example, the BMC in the host server may provide an out-of-band management interface for power-up control of the computing resource pool. After the memory resource pool jointly controls the Host server to power up to an ACPI S3 (suspend to RAM) state, a power-up operation for the memory is performed. After completion, out-of-band control is then performed on the Host server to continue to power up and power on, so as to allow the BIOS to complete a memory training process, thereby realizing the use of a normal function.

In some embodiments, by first powering up the Host server to the suspend-to-memory state, then performing power-up processing on the memory module, and finally completing the continuous power-up and power-on of the Host server, the rationality of collaborative power-up may be improved.

In some example embodiments, the method further includes:

at S101, a health state of each memory module in the memory resource pool is acquired, wherein the health state of each memory module is used for indicating a running condition of each memory module; and at S102, when it is determined that a second memory module in the memory resource pool is in a fault state based on the health state of each memory module, error information corresponding to the second memory module and a position of the second memory module in the memory resource pool are recorded in a form of a log, wherein the error information corresponding to the second memory module is used for indicating that the second memory module is in the fault state.

For ease of determination of the faulty memory module, the health state of each memory module may be detected, and the health state of each memory module in the memory resource pool may be acquired periodically or through triggering by events. The health state of each memory module is used for indicating the running condition of each memory module. The health state of the memory module may be determined based on one or more pieces of reference information, which may include, but is not limited to, at least one of the following: a running parameter of the memory module, running log information, or the like.

If it is determined that the second memory module in the memory resource pool is in the fault state based on the health state of each memory module, the fault state of the second memory module may be recorded. For example, the error information corresponding to the second memory module may be recorded in the form of a log. Here, the error information corresponding to the second memory module is used for indicating that the second memory module is in the fault state, and may also record the position of the second memory module in the memory resource pool. Based on the recorded log, the faulty memory module in the memory resource pool may be determined, and the position of the faulty memory module may also be determined. The second memory module may be the foregoing first memory module, or may also be a memory module different from the first memory module, and some embodiments is not limited thereto.

It should be noted that, for the foregoing scenario in which the baseboard management controller of the memory resource pool voluntarily determines the faulty memory module, the faulty memory module may be determined based on the recorded log, that is, the log corresponding to each memory module is read, the faulty memory module is determined based on the error information recorded in the log, and the faulty memory module is located based on the position of the faulty memory module recorded in the log.

In some embodiments, by acquiring the health state of each memory module in the memory resource pool, and recording the faulty memory module and the position of the faulty memory module in the memory resource pool in the form of a log, the convenience of the positioning of the faulty memory module may be improved.

In some example embodiments, acquiring a health state of each memory module in the memory resource pool includes:

at S111, state reference information corresponding to each memory module is acquired from a memory expander controller to which each memory module belongs, wherein the state reference information corresponding to each memory module is used for indicating the running condition of each memory module acquired by the memory expander controller to which each memory module belongs;

at S112, abnormity warning information corresponding to each memory module is acquired from a baseboard management controller of a host server corresponding to each memory module, wherein the abnormity warning information corresponding to each memory module is used for indicating an abnormal running condition of each memory module acquired by the host server corresponding to each memory module; and at S113, integration processing is performed on the state reference information corresponding to each memory module and the abnormity warning information corresponding to each memory module, so as to obtain the health state of each memory module.

In some embodiments, in order to acquire the health state of each memory module in the memory resource pool, the health state of each memory module may be obtained by acquiring various reference information corresponding to each memory module and performing integration processing on the acquired various reference information corresponding to each memory module. The various reference information corresponding to each memory module may include one or more types, and may include, but is not limited to, at least one of the following: state reference information corresponding to each memory module, wherein the state reference information corresponding to each memory module is used for indicating the running condition of each memory module acquired by the memory expander controller to which each memory module belongs, which may include, but is not limited to, at least one of the following state information: a voltage, a temperature, power consumption, or the like; or abnormity warning information corresponding to each memory module, wherein the abnormity warning information corresponding to each memory module is used for indicating an abnormal running condition of each memory module acquired by the host server corresponding to each memory module.

Alternatively, the baseboard management controller of the memory resource pool may acquire the state reference information corresponding to each memory module from the memory expander controller to which each memory module belongs, or may also acquire the abnormity warning information corresponding to each memory module from the baseboard management controller of the host server corresponding to each memory module; and integration processing is performed on the state reference information corresponding to each memory module and the abnormity warning information corresponding to each memory module to obtain the health state of each memory module.

The method of performing integration processing on the state reference information corresponding to each memory module and the abnormity warning information corresponding to each memory module may include: determining that the memory module is in the fault state based on any one piece of the information, and then determining that the memory module is in the fault state, or may also include: determining that the memory module is in the fault state based on any one piece of the information, then using another piece of the information to verify the fault state of the memory module, and determining whether the memory module is in the fault state based on the verification result, or may also include other integration methods, which are not limited in some embodiments.

Alternatively, the abnormity warning information corresponding to each memory module may be acquired from the baseboard management controller of the host server corresponding to each memory module through the redfish command, or may also be other commands that may be transmitted between the baseboard management controller of the memory resource pool and the baseboard management controller of the host server. In response to the BIOS of the host server corresponding to each memory module detect an abnormality when the host server powers on, the BIOS sends the abnormality warning information to the baseboard management controller of the corresponding host server, or may send the abnormality warning information to the baseboard management controller of the host server corresponding to each memory module at other times.

For example, the BMC of the memory resource pool collects a memory data transmission state acquired by the MXC, and combines same with the warning information identified and reported by the Host BIOS, so as to constitute the health state of each memory module, and monitors and alarms the health state. If a fatal memory error occurs and affects the normal running of the host server (i.e., memory data transmission is abnormal), system operation and maintenance personnel is informed to perform a memory replacement operation.

It should be noted that, if the fatal memory error occurs, the normal running of the service of the host server is affected. However, the abnormal running of a system service is not necessarily caused by memory faults. Only the memory fault is determined here, and when a memory abnormity is identified, the faulty memory is replaced.

Here, the memory data transmission state is acquired through interaction with the MXC, and the memory abnormity warning state information identified by the Host BIOS is acquired through interaction between the network switch and the Host BMC, such that memory fault warning is performed in combination with the memory health state information. After being identified, the memory fault state may be used by the operation and maintenance personnel through an OEM IPMI command, and single node power-down of the faulty memory is realized through the corresponding MXC, thereby achieving maintenance and replacement of the faulty memory when some nodes in the memory resource pool are powered down.

In some embodiments, by collecting the memory data transmission states acquired by the MXC, and combining same with the warning information identified and reported by the Host to constitute the health state of each memory module, the health state of the memory module may be detected, and the accuracy of detection of the health state of the memory module may be improved.

In some example embodiments, acquiring state reference information corresponding to each memory module from a memory expander controller to which each memory module belongs includes:

at S121, parameter information of a set of running parameters of each memory module is acquired from the memory expander controller to which each memory module belongs, wherein running state information of each memory module includes the parameter information of the set of running parameters of each memory module; and at S122, a mailbox event recording log corresponding to each memory module is acquired from the memory expander controller to which each memory module belongs, wherein the running state information of each memory module includes an error record which is extracted from the mailbox event recording log corresponding to each memory module and which is associated with a running state of each memory module.

In some embodiments, the state reference information corresponding to each memory module may include various types, and may include, but is not limited to, at least one of the following: parameter information of the set of running parameters of each memory module, wherein the running state information of each memory module includes parameter information of the set of running parameters of each memory module, which may include, but is not limited to, state information such as a voltage, a temperature, power consumption, or the like; or the error record associated with the running state of each memory module extracted from the mailbox event recording log corresponding to each memory module.

The baseboard management controller of the memory resource pool may acquire the parameter information of the set of operating parameters of each memory module from the memory expander controller to which each memory module belongs, and acquire the mailbox event recording log corresponding to each memory module from the memory expander controller to which each memory module belongs. For the mailbox event recording log corresponding to each memory module, an error record associated with the running state of each memory module may be extracted from the mailbox event recording log. The state reference information corresponding to each memory module includes: parameter information of the set of running parameters for each memory module, and the error record associated with the running state of each memory module.

For example, the manner that the BMC of the memory resource pool collects the memory data transmission states acquired by the MXC may be that, the BMC of the memory resource pool may interact with the MXC through the I2C command to acquire the state information of the memory such as a voltage, a temperature, power consumption, or the like, and determine its running health state through a threshold; and the BMC of the memory resource pool may interact with the MXC through the I2C command, acquire a Mailbox Event Records Log of the memory, and identify a Fatal Error, a Failure Error, and a Warning Error therein, so as to be used to determine the running health state of the memory.

The warning information identified and reported by the Host BIOS may include: errors such as a Correctable Error (CE), an UnCorrectable Error (UCE), Scrub Fail, a Configuration Error, or the like that may be identified by the Host BIOS and warn the memory, and the abnormity warning information that is informed to the Host BMC memory through an IPMI command AddSel method. The BMC of the memory resource pool then acquires the memory state information (From BIOS) from each Host BMC through the Redfish command over a network.

The BMC of the memory pool determines the running condition of the memory by integrating the above three memory health states, so as to determine whether the memory needs to be powered down and replaced.

It should be noted that, when the host server is powered on, after the BIOS is powered on to initialize the memory, an IPMI command is sent to record an SEL log of the memory module Presence detected (presence detection). Thereafter, if there is no abnormity in the memory module, the memory abnormity fault warning SEL log is not sent. If it is about to check whether the Host BMC receives memory warning information sent by the BIOS, whether there is a memory-related abnormity alarm in the current warning of the Host BMC is only required to be checked.

In some embodiments, the parameter information of the set of running parameters of each memory module and the mailbox event recording log corresponding to each memory module are acquired from the memory expander controller to which each memory module belongs, so as to acquire the state reference information corresponding to each memory module, such that the rationality and accuracy of the determination of the health state of the memory module may be improved.

In some example embodiments, performing integration processing on the state reference information corresponding to each memory module and the abnormity warning information corresponding to each memory module, so as to obtain the health state of each memory module includes:

at S131, a data transmission state of each memory module is identified according to the state reference information corresponding to each memory module, and a first identifying result corresponding to each memory module is determined;

at S132, the data transmission state of each memory module is identified according to the abnormity warning information corresponding to each memory module, and a second identifying result corresponding to each memory module is determined; and at S133, a memory module of which data transmission state is an abnormal state indicated by at least one of the corresponding first identifying result and the corresponding second identifying result in the memory resource pool is determined as a faulty memory module.

In some embodiments, the data transmission state of each memory module may be identified based on the state reference information corresponding to each memory module and the abnormity warning information corresponding to each memory module, and when one of the identifying results is that the data transmission state is an abnormal state, the memory module is determined as the faulty memory module, such that the faulty memory module may be determined in combination with various identifying results, thereby increasing a recall rate of the faulty memory module. Alternatively, the memory module that is incorrectly identified may be verified based on the foregoing verification mode, thereby avoiding incorrect power-down of the memory module.

For each memory module, the data transmission state of each memory module may be identified according to the state reference information corresponding to each memory module, and the first identifying result corresponding to each memory module is determined, which may be that the data transmission state is a normal state (data transmission is normal), or may also be that the data transmission state is an abnormal state (data transmission is abnormal). The data transmission state of each memory module may be identified according to the abnormity warning information corresponding to each memory module, and the second identifying result corresponding to each memory module is determined, which may be that the data transmission state is the normal state, or may also be that the data transmission state is the abnormal state. By fusing the two identifying results of each memory module, the data transmission state of each memory module is determined, that is, if the data transmission state indicated by at least one of the two identifying results is the abnormal state, the data transmission of the memory module is in the abnormal state, and the memory module with the data transmission state being the abnormal state may be determined as the faulty memory module.

In some embodiments, if it is determined that the data transmission of the memory module is abnormal based on at least one piece of the state reference information and the abnormity warning information, the memory module is determined as the faulty memory module, such that the recall rate of the faulty memory module may be increased, and an impact of the memory module fault on service running is avoided.

It should be noted that, for each of the foregoing method embodiments, for easy of description, the method embodiments are all expressed as a series of combinations of actions. However, a person skilled in the art should be aware that the present application is not limited by the sequence of the actions described, because certain steps may be performed in other sequences or simultaneously according to the present application. Then, the person skilled in the art should also be aware that the embodiments described in the specification are alternative embodiments, and the actions and modules involved are not necessarily necessary for the present application.

Another aspect of the embodiment of the present application further provides an apparatus for processing faulty memory module. The apparatus is configured to implement the method for processing faulty memory module provided in the above embodiments, and the description is no longer repeated here. As used hereinafter, the term "module" may be a combination of software and/or hardware that implements a predetermined function. Although the apparatus described in the following embodiment is preferably implemented in software, an implementation in hardware or a combination of software and hardware is possible and conceivable.

Figure 8:
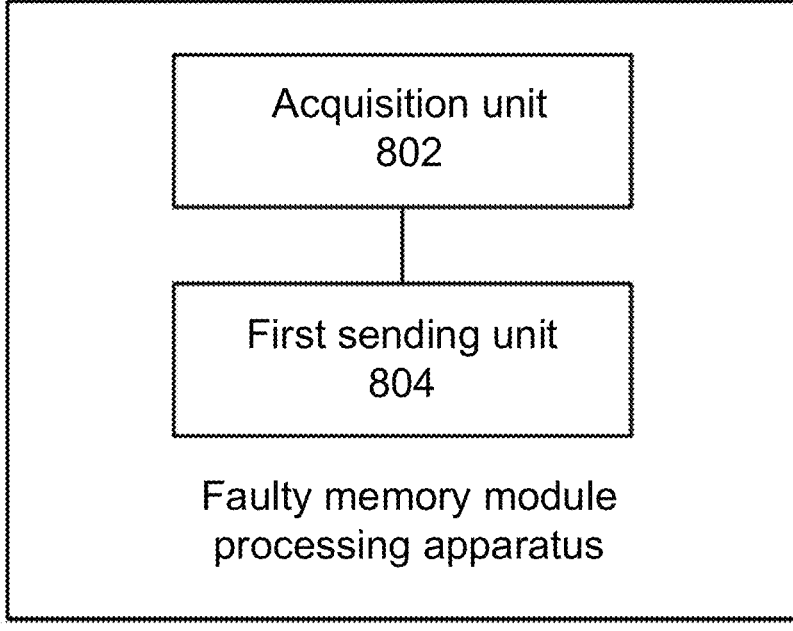
FIG. 8 is a structural block diagram of an apparatus for processing faulty memory module according to embodiments of the present application.

FIG. 8 is a structural block diagram of an apparatus for processing faulty memory module according to embodiments of the present application. As shown in FIG. 8, the apparatus includes:

an acquisition unit 802, configured to acquire a first power-down command, wherein the first power-down command is used for instructing a baseboard management controller of a memory resource pool to perform power-down processing on a faulty memory module in the memory resource pool; and a first sending unit 804, configured to, in response to the first power-down command, when a first memory module in the memory resource pool is in a fault state and the first memory module is allowed to be powered down, send a second power-down command to a target memory expander controller to which the first memory module belongs, wherein the second power-down command is used for instructing the target memory expander controller to perform power-down processing on the first memory module.

It should be noted that the acquisition unit 802 in some embodiments may be configured to perform step S202, and the first sending unit 804 in some embodiments may be configured to perform step S204.

In the embodiments of the present application, the first power-down command is acquired, wherein the first power-down command is used for instructing the baseboard management controller of the memory resource pool to perform power-down processing on the faulty memory module in the memory resource pool; in response to the first power-down command, when the first memory module in the memory resource pool is in the fault state and the first memory module is allowed to be powered down, the second power-down command is sent to the target memory expander controller to which the first memory module belongs, wherein the second power-down command is used for instructing the target memory expander controller to perform power-down processing on the first memory module. Therefore, the problem of a waste of resources caused by power-down of the whole memory resource pool in method for processing faulty memory modules in the related art may be solved, a waste of resources may be avoided, and the efficiency of system services is improved, thereby increasing a utilization rate of the memory resource.

As an alternative solution, the acquisition unit includes:

a receiving module, configured to receive the first power-down command sent by a control device, wherein the first power-down command carries position information of the first memory module, the position information of the first memory module is used for indicating a position of the first memory module in the memory resource pool, and the first power-down command is used for instructing the baseboard management controller of the memory resource pool to perform power-down processing on the first power-down command.

As an alternative solution, the apparatus further includes:

an extraction unit, configured to extract the position information of the first memory module from the first power-down command, wherein the position information of the first memory module includes first position information and second position information, the first position information is used for indicating a position of the target memory expander controller among a plurality of memory expander controllers connected to the baseboard management controller of the memory resource pool, and the second position information is used for indicating a position of the first memory module in the target memory expander controller; and a first determination unit, configured to determine a first memory module to be powered down according to the first position information and the second position information.

As an alternative solution, the apparatus further includes:

a second sending unit, configured to, in response to the first power-down command, when the first memory module is in a fault state but the first memory module is not allowed to be powered down, send first power-down abnormity indication information to the control device, wherein the first power-down abnormity indication information is used for indicating that power-down of the first memory module fails due to the first memory module being not allowed to be powered down; and a third sending unit, configured to, when the first memory module is in a normal state, send second power-down abnormity indication information to the control device, wherein the second power-down abnormity indication information is used for indicating that the power-down of the first memory module fails due to the first memory module being in the normal state.

As an alternative solution, the apparatus further includes:

a second determination unit, configured to determine a memory module in a fault state in the memory resource pool according to memory module fault information recorded by the baseboard management controller of the memory resource pool, wherein the memory module fault information is fault information that is recorded when the memory module in the fault state is detected and corresponds to the memory module in the fault state.

As an alternative solution, the apparatus further includes:

a fourth sending unit, configured to send a state verification command to the target memory expander controller, wherein the state verification command is used for instructing the target memory expander controller to verify the fault state of the first memory module; and a first receiving unit, configured to receive a first response message sent by the target memory expander controller in response to the state verification command, wherein the first response message is used for indicating whether the first memory module is in the fault state.

As an alternative solution, the apparatus further includes:

a fifth sending unit, configured to send a state acquisition command to a baseboard management controller of a target host server corresponding to the first memory module, wherein the state acquisition command is used for acquiring a power-on/off state of the target host server;

a second receiving unit, configured to receive a second response message returned by the baseboard management controller of the target host server in response to the state acquisition command, wherein the second response message is used for indicating the power-on/off state of the target host server; and a third determination unit, configured to, when the power-off state of the target host server is determined according to the second response message, determine that the first memory module is allowed to be powered down.

As an alternative solution, the baseboard management controller of the memory resource pool and a baseboard management controller of a host server corresponding to each memory module in the memory resource pool are connected to a same network switch.

As an alternative solution, the memory resource pool is located on a memory resource pool server, the memory resource pool server is connected to a baseboard management controller of a host server corresponding to each memory module in the memory resource pool through a compute express link CXL switch server, and the CXL switch server is used for allocating a memory resource to the host server corresponding to each memory module.

As an alternative solution, the first sending unit includes:

a first sending module, configured to, in response to the first power-down command, when the first memory module in the memory resource pool is in the fault state and the first memory module is allowed to be powered down, send the second power-down command to the target memory expander controller to which the first memory module belongs, and send a third power-down command to a memory expander controller to which a memory module in a same memory group as the first memory module belongs, wherein the memory modules in the memory resource pool are allocated to the host server in a manner of a memory group, and the third power-down command is used for instructing the memory expander controller to which the memory module in the same group belongs to perform power-down processing on the memory module in the same group.

As an alternative solution, the apparatus further includes:

a third receiving unit, configured to receive a first power-up command, wherein the first power-up command is used for indicating power-up processing for the first memory module which has been replaced; and a power-up unit, configured to, in response to the first power-up command, perform collaborative power-up processing on the first memory module and the target host server.

As an alternative solution, the power-up unit includes:

a second sending module, configured to, in response to the first power-up command, send a first out-of-band control instruction to a baseboard management controller of the target host server, wherein the first out-of-band control instruction is used for indicating power-up processing for the target host server;

an execution module, configured to receive a third response message returned by the baseboard management controller of the target host server in response to the first out-of-band control instruction, and send a second power-up command to the target memory expander controller, wherein the third response message is sent after the target host server is powered up to a suspend-to-memory state, and the second power-up command is used for indicating power-up processing for the first memory module; and a third sending module, configured to, after the first memory module is powered up, send a second out-of-band control instruction to the baseboard management controller of the target host server, wherein the second out-of-band control instruction is used for indicating continuous power-up processing for the target host server such that the target host server switches from the power-off state to a power-on state.

As an alternative solution, the apparatus further includes:

an acquisition module, configured to acquire a health state of each memory module in the memory resource pool, wherein the health state of each memory module is used for indicating a running condition of each memory module; and a recording module, configured to, when determining that a second memory module in the memory resource pool is in a fault state based on the health state of each memory module, record error information corresponding to the second memory module and a position of the second memory module in the memory resource pool in a form of a log, wherein the error information corresponding to the second memory module is used for indicating that the second memory module is in the fault state.

As an alternative solution, the acquisition module includes:

a first acquisition sub-unit, configured to acquire state reference information corresponding to each memory module from a memory expander controller to which each memory module belongs, wherein the state reference information corresponding to each memory module is used for indicating the running condition of each memory module acquired by the memory expander controller to which each memory module belongs;

a second acquisition sub-unit, configured to acquire abnormity warning information corresponding to each memory module from a baseboard management controller of a host server corresponding to each memory module, wherein the abnormity warning information corresponding to each memory module is used for indicating an abnormal running condition of each memory module acquired by the host server corresponding to each memory module; and an integration sub-unit, configured to perform integration processing on the state reference information corresponding to each memory module and the abnormity warning information corresponding to each memory module, so as to obtain the health state of each memory module.

As an alternative solution, the first acquisition sub-unit includes:

a first acquisition sub-module, configured to acquire parameter information of a set of running parameters of each memory module from the memory expander controller to which each memory module belongs, wherein running state information of each memory module includes the parameter information of the set of running parameters of each memory module; and a second acquisition sub-module, configured to acquire a mailbox event recording log corresponding to each memory module from the memory expander controller to which each memory module belongs, wherein the running state information of each memory module includes an error record that is extracted from the mailbox event recording log corresponding to each memory module and associated with a running state of each memory module.

As an alternative solution, the first acquisition sub-unit includes:

a control sub-module, configured to acquire the abnormity warning information corresponding to each memory module from the baseboard management controller of the host server corresponding to each memory module through a redfish command.

As an alternative solution, the abnormity warning information corresponding to each memory module is sent to the baseboard management controller of the host server corresponding to each memory module by a basic input output system of the host server corresponding to each memory module when an abnormity in each memory module is detected during a power-on process of the host server corresponding to each memory module.

As an alternative solution, the integration sub-unit includes:

a first execution sub-module, configured to identify a data transmission state of each memory module according to the state reference information corresponding to each memory module, and determine a first identifying result corresponding to each memory module;

a second execution sub-module, configured to identify the data transmission state of each memory module according to the abnormity warning information corresponding to each memory module, and determine a second identifying result corresponding to each memory module; and a determination sub-module, configured to determine a memory module of which data transmission state is an abnormal state indicated by at least one of the corresponding first identifying result and the corresponding second identifying result in the memory resource pool as a faulty memory module.

As an alternative solution, the first power-down command is an intelligent platform management interface IPMI command, and the second power-down command is a system management bus SMBus command or an inter-integrated circuit I2C command.

Alternative examples of this implementation may be referred to the examples shown in the method for processing faulty memory module, and thus are not repeated along longer herein in this implementation.

It should be noted that each of the above modules may be realized by software or hardware. In the case of the hardware, the modules can be realized, but is not limited thereby, in the following way: all the modules are in the same processor; or the modules are separately in different processors in the form of any combinations.

Another aspect of the embodiments of the present application further provides a non-transitory readable storage medium. The non-transitory readable storage medium stores a computer program, wherein the computer program is configured to perform the steps in any of the above method embodiments when being run.

In some example embodiments, the non-transitory readable storage medium may include, but is not limited to various storage media that can store computer programs, such as a USB flash disk, a read-only memory (ROM), a random access memory (RAM), a mobile hard disk, a magnetic disk, or an optical disk.

Another aspect of the embodiments of the present application further provides an electronic device, including a memory and a processor. The memory stores a computer program, and the processor is configured to run the computer program to execute steps in any one of the above method embodiments.

In some example embodiments, the electronic device may further include a transmission apparatus and an input/output device, wherein the transmission apparatus is connected to the processor, and the input/output device is connected to the processor.

Examples in some embodiments can be referred to the examples described in the above embodiments and example implementations, which are no longer repeated herein.

Obviously, those skilled in the art should understand that the modules or steps in the embodiments of the present application may be implemented with a general-purpose computing device. The modules or steps can be centralized on a single computing device or distributed on a network consisting of a plurality of computing devices, can be implemented with program codes executable by the computing device, and thus can be stored in a storage device and executed by the computing device. Moreover, in some cases, the steps shown or described can be performed in an order different from the order here or can be separately produced as individual integrated circuit modules, or a plurality of the modules or steps can be produced as a single integrated circuit module. In this way, the embodiments of the present application are not limited to any particular combination of hardware and software.

The above embodiments are merely alternative embodiments of the present application and are not used for limiting the embodiments of the present application. For those skilled in the art, the present application may have various modifications and variations. Any modification, equivalent replacement, improvement, etc. made within the principle of the embodiments of the present application should be included in the protection scope of the embodiments of the present application.

The invention claimed is:

1. A method for processing a faulty memory module, comprising:

acquiring a first power-down command, wherein the first power-down command is used for instructing a baseboard management controller of a memory resource pool to perform power-down processing on a faulty memory module in the memory resource pool, and the first power-down is sent by a control device; and in response to: the first power-down command, a first memory module in the memory resource pool is in a fault state and is allowed to be powered down, sending, by the baseboard management controller of the memory resource pool, a second power-down command to a target memory expander controller to which the first memory module belongs, wherein the second power-down command is used for instructing the target memory expander controller to perform power-down processing on the first memory module of a plurality of memory modules subordinate to the target memory expander controller.

2. The method as claimed in claim 1, wherein the first power-down command carries position information of the first memory module, the position information of the first memory module is used for indicating a position of the first memory module in the memory resource pool, and the first power-down command is used for instructing the baseboard management controller of the memory resource pool to perform power-down processing on the first memory module.

3. The method as claimed in claim 2, wherein after acquiring the first power-down command, the method further comprises:

extracting the position information of the first memory module from the first power-down command, wherein the position information of the first memory module comprises first position information and second position information, the first position information is used for indicating a position of the target memory expander controller among a plurality of memory expander controllers connected to the baseboard management controller of the memory resource pool, and the second position information is used for indicating a position of the first memory module in the target memory expander controller; and determining the first memory module to be powered down according to the first position information and the second position information.

4. The method as claimed in claim 2, wherein after acquiring the first power-down command, the method further comprises:

in response to the first power-down command, when the first memory module is in a fault state but is not allowed to be powered down, sending first power-down abnormity indication information to the control device, wherein the first power-down abnormity indication information is used for indicating that power-down of the first memory module fails due to the first memory module being not allowed to be powered down; and in response to the first memory module is in a normal state, sending second power-down abnormity indication information to the control device, wherein the second power-down abnormity indication information is used for indicating that the power-down of the first memory module fails due to the first memory module being in the normal state.

5. The method as claimed in claim 1, wherein after acquiring the first power-down command, the method further comprises:

determining a memory module in a fault state in the memory resource pool according to memory module fault information recorded by the baseboard management controller of the memory resource pool, wherein the memory module fault information is fault information which is recorded in response to the memory module in the fault state is detected and which corresponds to the memory module in the fault state.

6. The method as claimed in claim 1, wherein after acquiring the first power-down command, the method further comprises:

sending a state verification command to the target memory expander controller, wherein the state verification command is used for instructing the target memory expander controller to verify the fault state of the first memory module; and receiving, by the baseboard management controller of the memory resource pool, a first response message sent by the target memory expander controller in response to the state verification command, wherein the first response message is used for indicating whether the first memory module is in the fault state.

7. The method as claimed in claim 1, wherein after acquiring the first power-down command, the method further comprises:

sending, by the baseboard management controller of the memory resource pool, a state acquisition command to a baseboard management controller of a target host server corresponding to the first memory module, wherein the state acquisition command is used for acquiring a power-on/off state of the target host server;

receiving, by the baseboard management controller of the memory resource pool, a second response message returned by the baseboard management controller of the target host server in response to the state acquisition command, wherein the second response message is used for indicating the power-on/off state of the target host server; and when the power-off state of the target host server is determined as claimed in the second response message, determining that the first memory module is allowed to be powered down.

8. The method as claimed in claim 7, wherein the baseboard management controller of the memory resource pool and a baseboard management controller of a host server corresponding to each memory module in the memory resource pool are connected to a same network switch.

9. The method as claimed in claim 7, wherein the memory resource pool is located on a memory resource pool server, the memory resource pool server is connected to a baseboard management controller of a host server corresponding to each memory module in the memory resource pool through a compute express link (CXL) switch server, and the CXL switch server is used for allocating a memory resource to the host server corresponding to each memory module.

10. The method as claimed in claim 9, wherein in response to the first power-down command, when the first memory module in the memory resource pool is in a fault state and is allowed to be powered down, sending the second power-down command to a target memory expander controller to which the first memory module belongs comprises:

in response to the first power-down command, when the first memory module in the memory resource pool is in the fault state and is allowed to be powered down, sending the second power-down command to the target memory expander controller to which the first memory module belongs, and sending, by the baseboard management controller of the memory resource pool, a third power-down command to a memory expander controller to which a memory module in a same memory group as the first memory module belongs, wherein the memory modules in the memory resource pool are allocated to the host server in a manner of a memory group, and the third power-down command is used for instructing the memory expander controller to which the memory module in the same group belongs to perform power-down processing on the memory module in the same group.

11. The method as claimed in claim 1, wherein before performing power-down processing on the first memory module, a target host server corresponding to the first memory module is in a power-off state; and after sending the second power-down command to the target memory expander controller to which the first memory module belongs, the method further comprises:

receiving, by the baseboard management controller of the memory resource pool, a first power-up command, wherein the first power-up command is used for indicating power-up processing for the first memory module which has been replaced, and the first power-up is sent by a control device; and in response to the first power-up command, performing collaborative power-up processing on the first memory module and the target host server.

12. The method as claimed in claim 11, wherein in response to the first power-up command, performing collaborative power-up processing on the first memory module and the target host server comprises:

in response to the first power-up command, sending, by the baseboard management controller of the memory resource pool, a first out-of-band control instruction to a baseboard management controller of the target host server, wherein the first out-of-band control instruction is used for indicating power-up processing for the target host server;

receiving a third response message returned by the baseboard management controller of the target host server in response to the first out-of-band control instruction, and sending, by the baseboard management controller of the memory resource pool, a second power-up command to the target memory expander controller, wherein the third response message is sent after the target host server is powered up to a suspend-to-memory state, and the second power-up command is used for indicating power-up processing for the first memory module; and after the first memory module is powered up, sending, by the baseboard management controller of the memory resource pool, a second out-of-band control instruction to the baseboard management controller of the target host server, wherein the second out-of-band control instruction is used for indicating continuous power-up processing for the target host server such that the target host server switches from the power-off state to a power-on state.

13. The method as claimed in claim 1, further comprising:

acquiring a health state of each memory module in the memory resource pool, wherein the health state of each memory module is used for indicating a running condition of each memory module; and when determining that a second memory module in the memory resource pool is in a fault state based on the health state of each memory module, recording error information corresponding to the second memory module and a position of the second memory module in the memory resource pool in a form of a log, wherein the error information corresponding to the second memory module is used for indicating that the second memory module is in the fault state.

14. The method as claimed in claim 13, wherein acquiring the health state of each memory module in the memory resource pool comprises:

acquiring, by the baseboard management controller of the memory resource pool, state reference information corresponding to each memory module from a memory expander controller to which each memory module belongs, wherein the state reference information corresponding to each memory module is used for indicating the running condition of each memory module acquired by the memory expander controller to which each memory module belongs;

acquiring abnormity warning information corresponding to each memory module from a baseboard management controller of a host server corresponding to each memory module, wherein the abnormity warning information corresponding to each memory module is used for indicating an abnormal running condition of each memory module acquired by the host server corresponding to each memory module; and performing integration processing on the state reference information corresponding to each memory module and the abnormity warning information corresponding to each memory module, so as to obtain the health state of each memory module.

15. The method as claimed in claim 14, wherein acquiring state reference information corresponding to each memory module from the memory expander controller to which each memory module belongs comprises:

acquiring parameter information of a set of running parameters of each memory module from the memory expander controller to which each memory module belongs, wherein running state information of each memory module comprises the parameter information of the set of running parameters of each memory module; and acquiring a mailbox event recording log corresponding to each memory module from the memory expander controller to which each memory module belongs, wherein the running state information of each memory module comprises an error record which is extracted from the mailbox event recording log corresponding to each memory module and which is associated with a running state of each memory module.

16. The method as claimed in claim 14, wherein acquiring abnormity warning information corresponding to each memory module from the baseboard management controller of a host server corresponding to each memory module comprises:

acquiring the abnormity warning information corresponding to each memory module from the baseboard management controller of the host server corresponding to each memory module through a redfish command.

17. The method as claimed in claim 14, wherein the abnormity warning information corresponding to each memory module is sent to the baseboard management controller of the host server corresponding to each memory module by a basic input/output system of the host server corresponding to each memory module when the host server corresponding to each memory module detects that each memory module has an abnormity during a power-up process.

18. The method as claimed in claim 14, wherein performing integration processing on the state reference information corresponding to each memory module and the abnormity warning information corresponding to each memory module, so as to obtain the health state of each memory module comprises:

identifying a data transmission state of each memory module according to the state reference information corresponding to each memory module, and determining a first identifying result corresponding to each memory module;

identifying the data transmission state of each memory module according to the abnormity warning information corresponding to each memory module, and determining a second identifying result corresponding to each memory module; and determining a memory module of which the data transmission state is an abnormal state indicated by at least one of the corresponding first identifying result and the corresponding second identifying result in the memory resource pool as a faulty memory module.

19. A non-transitory readable storage medium, storing a computer program therein, wherein the computer program implements the steps of the method for processing the faulty memory module as claimed in claim 1 when being executed by a processor.

20. An electronic device, comprising a memory, a processor, and a computer program stored on the memory and runnable on the processor, wherein the processor, when executing the computer program, implements the steps of the method for processing the faulty memory module as claimed in claim 1.

* * * * *